United States Patent [19]

Yamamura

[11] Patent Number: 5,270,578
[45] Date of Patent: Dec. 14, 1993

[54] METHOD AND SYSTEM FOR CONTROLLING ELECTRIC LOADS WITH HIGH RELIABILITY

[75] Inventor: Hirohisa Yamamura, Hitachioota, Japan

[73] Assignee: Hitachi, Ltd., Tokyo, Japan

[21] Appl. No.: 637,787

[22] Filed: Jan. 7, 1991

[30] Foreign Application Priority Data

Jan. 8, 1990 [JP] Japan .................................. 2-1256

[51] Int. Cl.$^5$ .............................................. H02J 1/00
[52] U.S. Cl. ........................................ 307/39; 307/34
[58] Field of Search ................ 307/38, 39, 34, 27, 307/29, 9.1, 10.1

[56] References Cited

U.S. PATENT DOCUMENTS 4,403,292  9/1983  Ejzak et al. ........................... 307/29
4,465,942  8/1984  Deicke .................................. 307/39

Primary Examiner—A. D. Pellinen
Assistant Examiner—Richard Elms
Attorney, Agent, or Firm—Antonelli, Terry, Stout & Kraus

[57] ABSTRACT

A system and method for controlling plural load with high reliability, comprising plural control devices for respectively controlling the plural electric loads, plural switches for respectively giving ordering signals to the control devices to control the respective loads, and a monitor circuit for detecting an out of order control device and generating ordering signals for selecting another control device which is not out of order based on the superiority of the other electric load and the ordering signals from the switches which correspond to the other control device to change from the control device which is out of order to the other control device.

13 Claims, 6 Drawing Sheets

METHOD AND SYSTEM FOR CONTROLLING ELECTRIC LOADS WITH HIGH RELIABILITY

BACKGROUND OF THE INVENTION

The present invention relates to a method and system for controlling the operation of electric loads with high reliability.

With the progress of electronic circuits in the automotive industry, for instance, various kinds of electronic equipment (electric loads) have been adapted for use with their respective control devices by which they are driven. In case any one of these control devices develops trouble, it is to be desired that such a control device is backed up to keep the relevant electric load operating in view of safety and the like.

The known backup practice is to provide a standby control device for emergency use in addition to what is used regularly.

As the prior art backup means, moreover, there are those other than the control devices described above as follows:

In an engine drive refrigeration apparatus as disclosed in Japanese Patent Laid-Open No. 113267/1988, there is provided a generator whose function is switchable from power generation to electromotion in a system for transmitting power to the engine and a compressor. When the engine as a power source fails in that case, the power transmission system is switched so that the generator is used as a motor to back up the power source.

In the prior art described in Japanese Patent Laid-Open No. 95121/1974, a plurality of loads are alternately operated by a motor for their common use.

In the proposed prior art of controlling the operation of pumps according to Japanese Patent Laid-Open No. 84318/1989, the priority order is first given to a plurality of operating pumps for regular use and when one of them fails to operate, any one of the remaining pumps is selected from among them and designated for backing up what is out of order in accordance with the priority order.

In the prior art backups as disclosed in Japanese Patent Laid-Open Nos. 113267/1988, 95121/1974, 84318/1989 and the like, those examples include using the generator as a motor by mechanically switching the function of the power transmission system and otherwise designating an electric load which can be substituted for the inoperative from among those for regular use. However, it still remains infeasible to deal with the control device which is out of order.

Consequently, any measure taken to cope with the electric load control device which has developed trouble is to use a standby control so as to keep the electric load operating.

Notwithstanding the use of such standby controls would result in an increase in the number of components like control devices, thus increasing cost. As automobiles can afford only a small space, which tends to restrict the installation of standby control devices, there is still room for improvement in the prior art.

SUMMARY OF THE INVENTION

In view of the foregoing problems, an object of the present invention is to provide an art of backing up control devices to keep electric loads operating without using standby control devices when the controls for the electric loads have developed trouble to not only reduce cost but also make use of a limited installation space.

In order to accomplish the object stated above, means for solving the following fundamental problems are proposed according to the present invention.

In the first place, the present invention is concerned with a method of controlling the operation of electric loads. More specifically, a system for use in the method thus proposed comprises a plurality of loads that are started under respective control instructions, a plurality of control devices corresponding to the respective loads, a monitor circuit for judging whether or not any one of the control devices is out of order, and changeover switches for switching each electrical control-to-load connection over to another.

When any control device has developed trouble, another whose load is lower in priority than what has been connected to the inoperative control device or whose load is held off is selected from among the remaining ones to be used for the other respective loads and substituted for what is out of order. The changeover switch is then used to electrically connect the control device thus selected to the load connected to the inoperative control device; the control function is also switched over so that the inoperative control device can be backed up.

With the means for solving the first problem, the monitor circuit operates to detect the inoperative control device in case any one of the controls corresponding to the respective loads develops trouble. Then another control whose load is lower in priority than what has been connected to the inoperative control device or whose load is held off is selected from among the remaining ones to be used for the other loads and substituted for what is inoperative. The changeover switch is then used to electrically connect the control device thus selected to what has been connected to the inoperative control device; the control function is also switched over so that the inoperative control device can be backed up.

In this way, another control device is used as a backup to keep the load operating even when what is connected thereto has developed trouble.

In this operation control method, a backup is properly selected from among the other control devices for regular use, whereby the conventional stand-by control device for emergency use can be dispensed with.

Secondly, the present invention is concerned with a reliable control system for use in the control method as the first means. The system comprises a plurality of loads respectively designed for different uses, these loads being started under respective control instructions, a plurality of control devices corresponding to these loads and storing various control programs for use in controlling any other load, changeover switches for switching each electrical control-to-load connection over to another, and a monitor circuit having functions including judging whether or not any one of the control devices is inoperative, selecting a substitutive control device from among the plurality of control devices when any one of them has developed trouble by detecting what is lower in priority than the load connected to the inoperative control device or what remains subject to an off instruction, and sending to the changeover switch an instruction as to electrically switching the load connected to the inoperative control device over to the control device thus selected.

When the monitor circuit selects such a substitutive control device, it may make a decision flexibly by taking into consideration the control instructions (e.g., the presence or absence of the off instructions) given to the respective loads and the priority order logically or prearranging the loads in ranks according to the priority order.

To solve the second problem, the respective control devices, corresponding to the respective loads, store control programs for implementing the method of controlling the operation and additionally store the plurality of programs for use in controlling any other load.

When the monitor circuit selects a substitutive control device for one which has developed trouble, the electrical control-to-load connection another control device and the control program stored in the substitutive control is also to control the load associated with the inoperative control.

Moreover, the monitor circuit has the function of selecting such a substitutive control device by detecting what is lower in priority than the load connected to the inoperative control device or what remains subject to the off instruction. In this way, the inoperative control device can be backed up by another for regular use by making the changeover switch operate in line with the switching of the control device over to the load.

DETAILED DESCRIPTION OF THE PREFERRED EMBODIMENTS

An embodiment of the present invention will be described with reference to the accompanying drawings.

Figure 1:
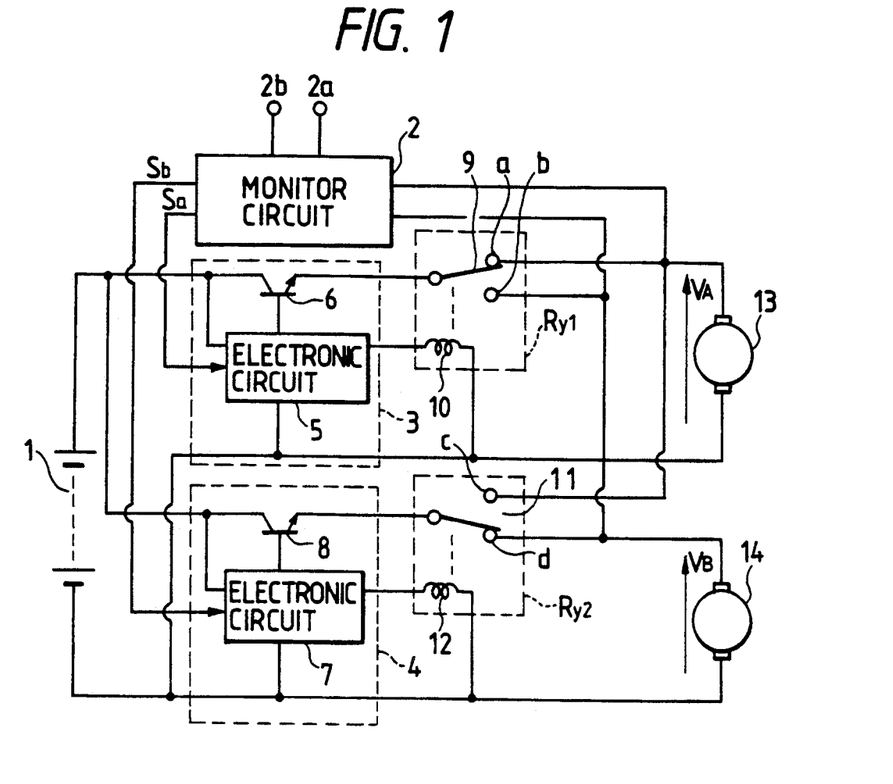
FIG. 1 is a block diagram of a system embodying the present invention.

FIG. 1 is a block diagram of a control system with reliability as a first embodiment of the present invention.

Figure 2:
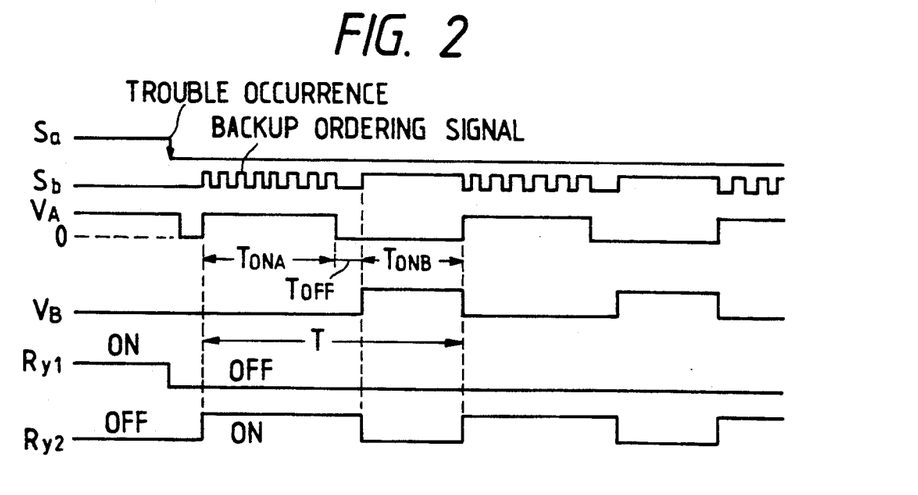
FIG. 2 is a timing chart illustrating the operating conditions in FIG. 1.

FIG. 2 is a timing chart illustrating the operation.

FIG. 1 illustrates an application of the system to controlling automotive electric equipment, the system comprising a battery power source 1, a monitor circuit 2, a control device 3 for controlling the driving of a blower motor 13, and a control device 4 for controlling the driving of a power window motor 14 (window motor).

The monitor circuit 2 has the function of not only monitoring a control instruction 2a for the blower motor 13, a start instruction 2b for the window motor 14, the presence or absence of trouble with the control devices 3, 4 from the conditions of generating voltages VA and VB of the blower motor 13 and the window motor 14 respectively, but also producing a backup instruction signal by selecting either control device 3 or 4 as a substitute when one of them has developed trouble.

The selection of the substitutive control device is made by comparing the priority degree of the load connected to an inoperative control device with that of the other load and deciding to choose the control device connected to the load with a lower priority or with an off-control instruction. The decision to be made on the priority degree depends on conditions including frequency of use, importance and the like. The selection of such a control device will be described in detail later.

The control device 3 comprises an electric circuit (microcomputer) 5 and a power transistor 6, whereas the control device 4 comprises an electronic circuit (microcomputer) 7 and a power transistor 8.

The electronic circuit 5 of the control device 3 and the electronic circuit 7 of the control device 4 store, in their respective storage circuits (ROMs), a program A for controlling the blower motor 13 by means of the power transistor 6 and a program B for controlling the window motor 14 by the power transistor 8. These electronic circuits 5, 7 also function as those capable of alternately switching the program A over to the program B according to a backup instruction signal.

Relays Ry1, Ry2, have the function of alternately switching the connection of the blower motor 13 with the control device 3 over to the control device 4 and that of the window motor 14 with the control device 4 over to the control device 3, respectively. The relay Ry1 comprises a switching contact 9 and a relay coil 10, whereas the relay Ry2 comprises a switching contact 11 and a relay coil 12.

While the switching contact 9 remains to contact a, the control device 3 and the blower motor 13 are electrically connected, whereas the control device 4 and the window motor 14 are also electrically connected while it remains to contact b. While the switching contact remains to contact c, the control device 4 and the blower motor 13 are electrically connected, whereas the control device 4 and the window motor 14 are thus connected while it remains to contact d.

The operation of this embodiment will subsequently be described with reference to a timing chart of FIG. 2.

Sa and Sb of FIGS. 1 and 2 represent signals to be applied from the monitor circuit 2 to the control device 3, 4. A description will then be given of a case where the control has developed trouble when the control instruction 2a is given to control the voltage of the blower motor 13. The voltage of the blower motor 13 is controlled in conformity with the control instruction 2a given by a fan lever.

The signals Sa, Sb are intended to instruct which one of the loads should be controlled. While the signal is at high level, the operating condition is maintained and while it is at low level, that condition is suspended. As long as the control devices 3, 4 are kept is normal operating condition, the contact of the changeover switch 9 is at a, whereas the changeover switch 11 is set at d.

In case the control device 3 develops trouble during the operation of the blower motor 13 under control, the signal Sa changes from high to low level. The monitor circuit 2 then detects the trouble with the control device 3 and if the operation control order for the window motor 14 is shown to be suspended, the signal Sb is caused to carry the backup ordering signal, which is a pulsating signal repeating an on-off state with a predetermined period.

On receiving the backup ordering signal, the control device 4 applies to a relay coil an Ry2 signal (on signal) for switching the contact 11 of the relay Ry2 to c and simultaneously switches the control program for the power transistor 8 from B for the window motor over to A for controlling the blower motor 13.

In this way, the control device 4 in place of the control device 3 keeps controlling the operation of the blower motor 13 (voltage VA).

When the window motor control instruction 2b is issued during the substitutive operation described above, with the contact 11 of the window motor 14 switched over to c, however, the signal Sb keeps the high level for a predetermined time $T_{ONA}$ and the control device 4 produces an Ry2 signal (off signal) such that the contact 11 of the relay Ry2 temporarily returns to d. Simultaneously, the control program in the control device 4 is also switched over to the program B. $T_{OFF}$ of FIG. 2 represents delay time in the operation of the relay contact between $T_{ONA}$ and $T_{ONB}$. The operation of the window motor 14 (voltage VB) is thus controlled by the control device 4. The operation of the window motor 14 at this time interrupts the operation of the blower motor 13 by the time $T_{ONB}$ during which the window is opened and shut; since it is an interval of only several seconds, however, not so much trouble is caused, though the revolution of the fan temporarily decreases.

Since the control device 3 remains inoperative, the monitor circuit 2 then reissues the backup ordering signal as the signal Sb to the control device 4 and causes the control device 4 to control the operation of the blower motor 13 again. In other words, the control device 4 is used to control the load (window motor) 14, which is low in frequency of use, i.e., requires only several seconds for operation, is selected as a substitute in this case and when the load 14 is switched on, the function of the control device 4 is temporarily returned to the initial one.

By switching the contact of the relay Ry2 from one to the other in this way, the control device 4 alternately operates the blower motor 13 and the window motor 14. As a result, the blower motor 13 and the window motor 14 are to be controlled on a time division basis at duty ratios of $T_{ONA}/T$ and $T_{ONB}/T$, respectively. Moreover, both the motors can gain minimum necessary power.

When the power supply switch of the blower motor 13 is turned off, the relay Ry2 returns the contact 11 to d.

When the control device 4, in place of the control device 3 develops trouble, the control device 3 which normally controls the operation of the blower motor 13 is substituted. With the switch of the window motor 14 that has been turned on, the control device 3 is temporarily selected as a substitute to be used for the window motor, so that the operation of the window motor 14 is temporarily controlled. In other words, priority is given to the window motor 14 instead of the blower motor 13 in this case.

When one of the control device 3, 4 for controlling electric components becomes inoperative, the other one for regular use is employed for backup purposes in the embodiment shown, it is possible to provide a reliable operation control system with minimum necessary component parts as compared with a simple double backup system using standby control devices.

Figure 3:
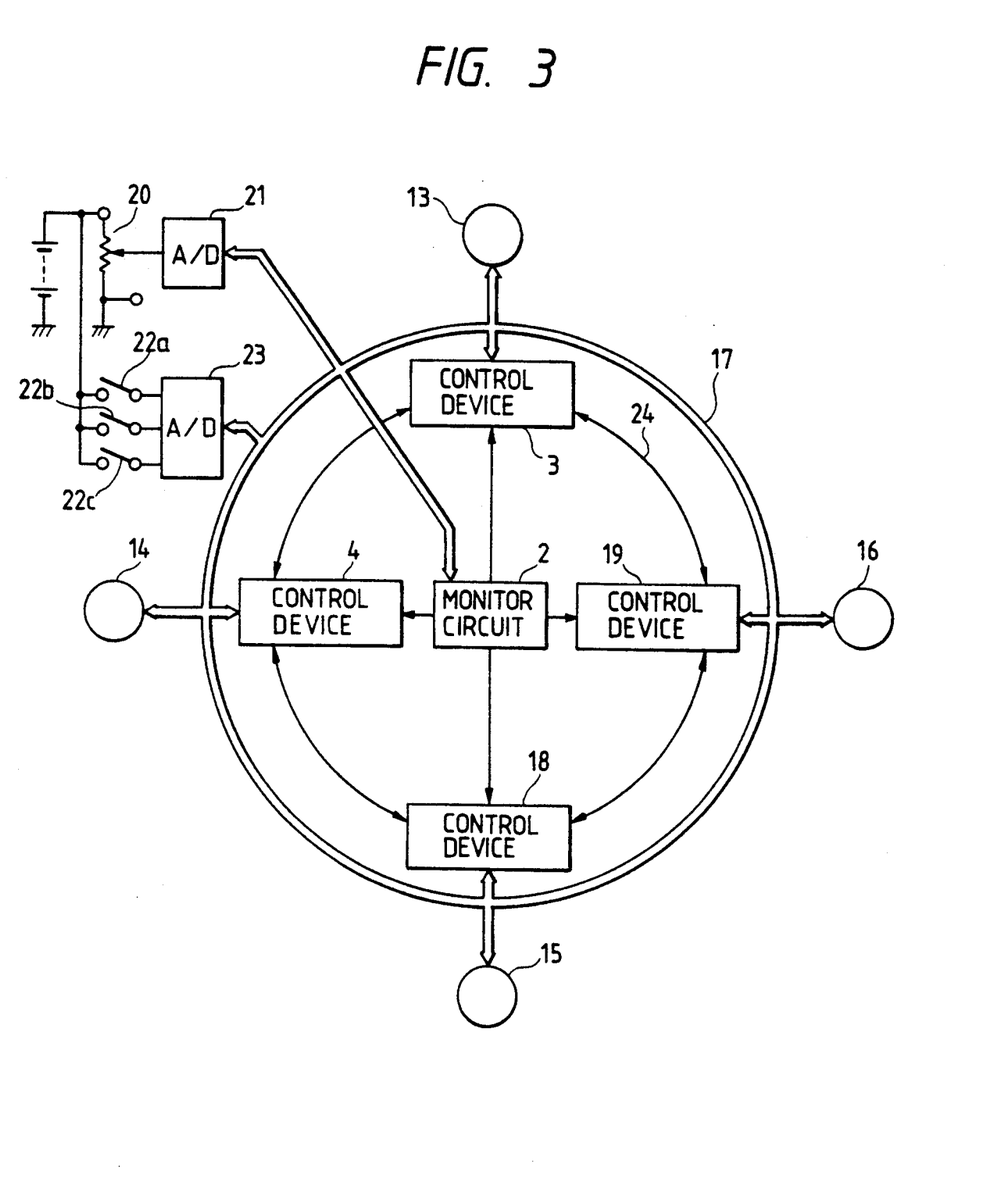
FIG. 3 is a block diagram of another system embodying the present invention.

FIG. 3 shows a second embodiment of the present invention. In FIG. 3, like reference characters designate like or corresponding parts in the first embodiment thereof.

In this embodiment, a light 15 and a glass heating coil 16, in addition to the blower motor 13 and the window motor 14, are employed as electric loads.

In FIG. 3, there is shown an arrangement of a bus line 17 for common use in data reception/transmission, which is effected among control devices 3, 4, 18, 19 corresponding a fan lever 20, a window motor switch 22a, a light switch 22b, a heating coil switch 22c and the like by means of the bus line 17, whereby they constitute a vehicular LAN (Local Area Network), Addresses are provided to make it possible for the designated ones to access the data reception/transmission.

Numeral 24 denotes a power line for power supply.

On condition that all the controls are in normal operation, the control devices 3, 4, 18, 19 control the blower motor 13, the window motor 14, the light 15 and the glass heating coil 16, respectively.

The lever position of the fan lever switch 20 of the blower motor 13 is sent in the form of a digital voltage signal by an A/D converter 21 via the bus line 17. Moreover, data on a window motor switch 22a, the light switch 22b and the heating coil switch 22c are sent as digital signals via a converter 23 to the data bus 17.

The power line 24 for supplying power is set so that each electrical control-to-load connection is switchable over to another. Each of the control devices 3, 4, 18, 19 is stored with a plurality of control programs for exercising control device over the loads 13, 14, 15, 16.

When one of the control devices respectively for the blower motor 13, the window motor 14, the light and the glass heating coil 16 has developed trouble in this embodiment, a substitutive control device is selected in consideration of the importance and situation of use as shown in flow charts of FIGS. 4 through 7 illustrating examples of selecting substitutive control devices, including cases where the control device 18 for the light 15, the control device 3 for the blower motor 13 and the control device 19 for the glass heating coil 16 become inoperative, respectively.

Figure 4:
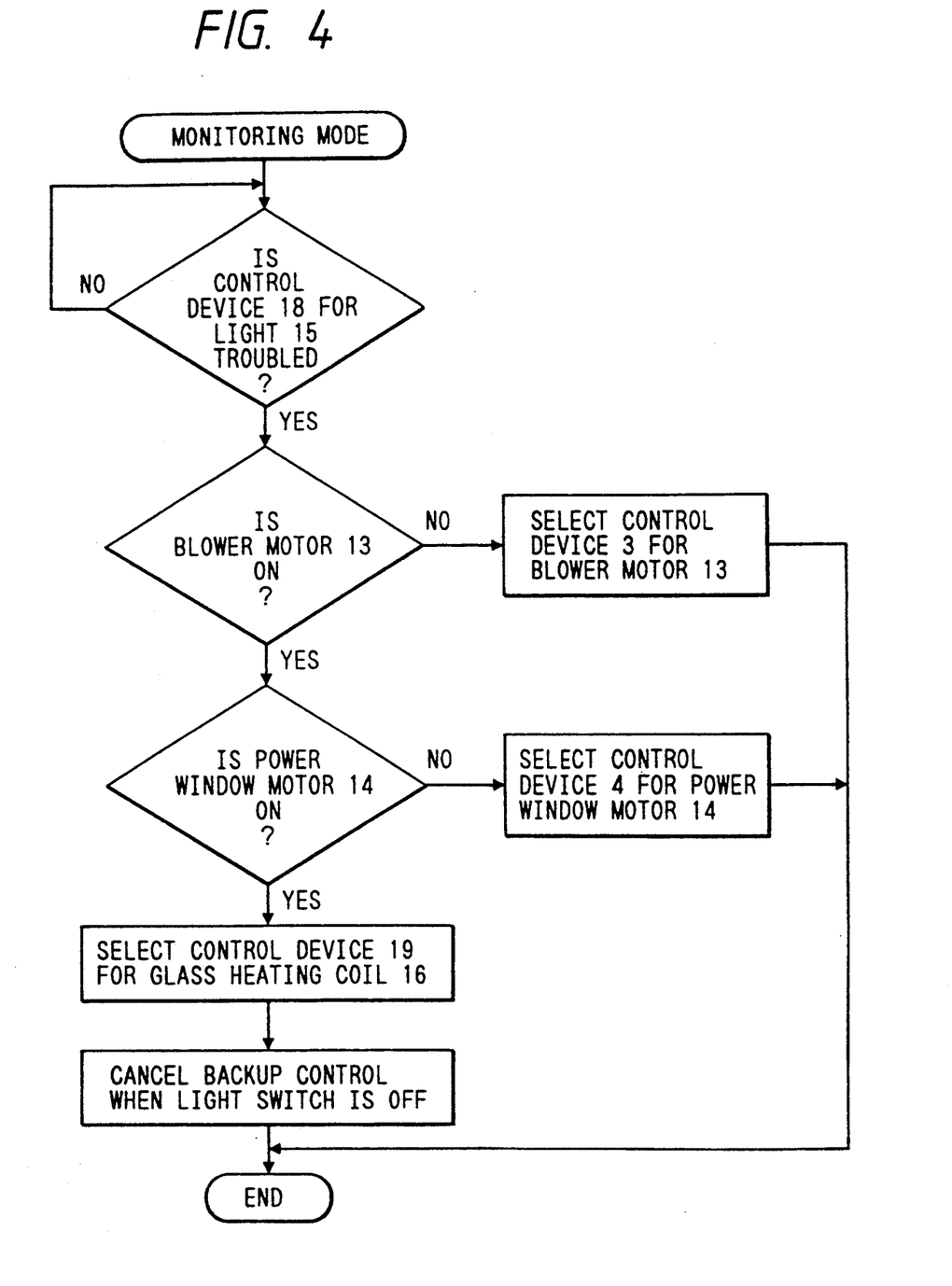
FIG. 4 through 7, inclusive, are flow charts illustrating the operating conditions in FIG. 3.

When the control device 18 for the light 15 has developed trouble as shown in FIG. 4, the control device 3 used for the blower motor until then is selected as a substitute and used for the light, provided the blower motor 13 is held off. While the blower motor 13 is in operation (including a case where the switch is turned on after the selection is made), a decision is made on whether the control device 4 for the window motor 14 should be selected as substitute. When the window motor 14 is held off, the control device 4 is selected as a substitute and used for the light 15. While the window motor 14 is in operation the glass heating coil 16 is judged lower in priority than the light 15 and the control device 19 used for the glass heating coil until then is selected as a substitute and used for the light 15.

A description will subsequently given of a case where the control device for the blower motor has developed trouble.

Figure 5:
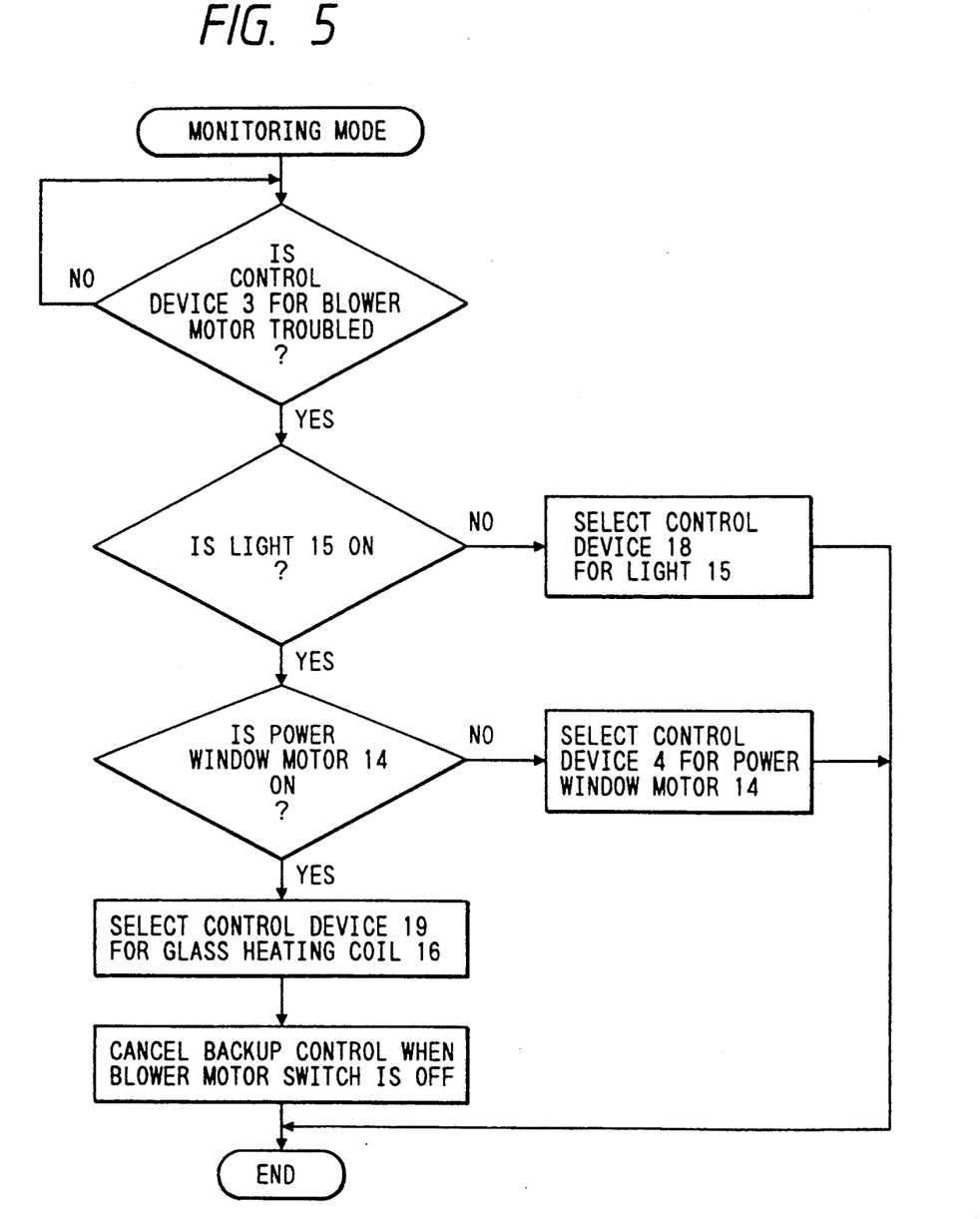

When the control device 3 for the blower motor 13 has developed trouble as shown in FIG. 5, the control device 18 used for the light until then is selected as a substitute for the control device 3 for the blower motor, provided the switch of the light 15 is held off. In other words, though the light 15 in use is more important than the other loads 13, 14, 16, it is less important in open daylight, for instance, in which no lighting is usually required. The control device 18 is thus selected as a substitute for the blower motor control device. While the light 15 is held on, a decision is made on whether it should be used to control the window motor 14 as a substitute. While the window motor 14 is held off, the control device 4 therefor is selected as a substitute. While the window motor 14 is otherwise held on, the glass heating coil 16 is considered lower in priority than the blower motor 13 and the control device 19 used for the glass heating coil until then is selected and used for the blower motor 13.

A case where the control device 4 for the power window motor 14 has developed trouble will subsequently be described.

Figure 6:
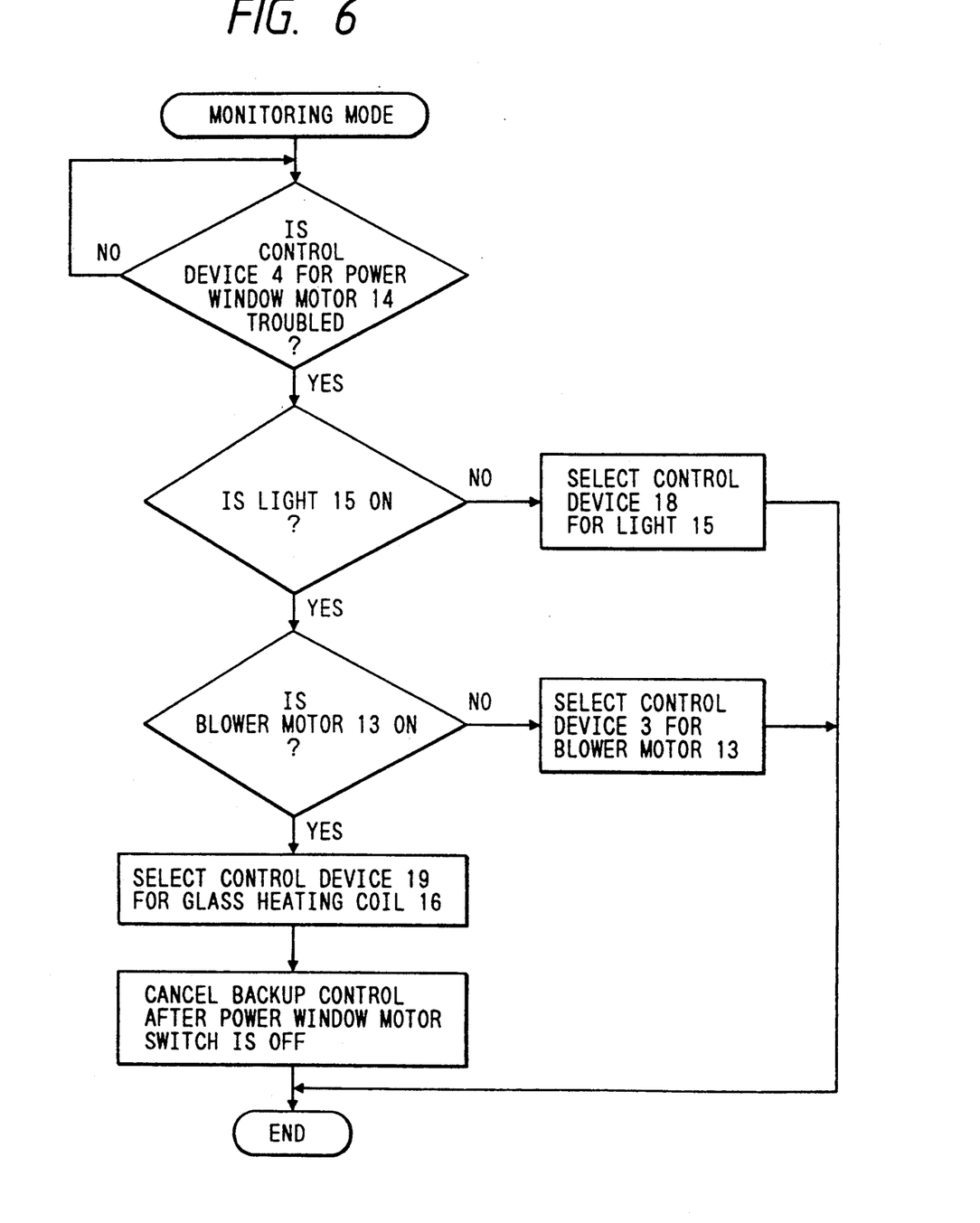

When the control device 4 for the power window motor 14 has developed trouble as shown in FIG. 6, the control device 18 used for the light until then is selected and used as a substitute for the control device 4, provided the light switch 22b is held off. A description which follows will be omitted as it is similar to a case where the power window motor is substituted for the blower motor with reference to FIG. 5.

Figure 7:
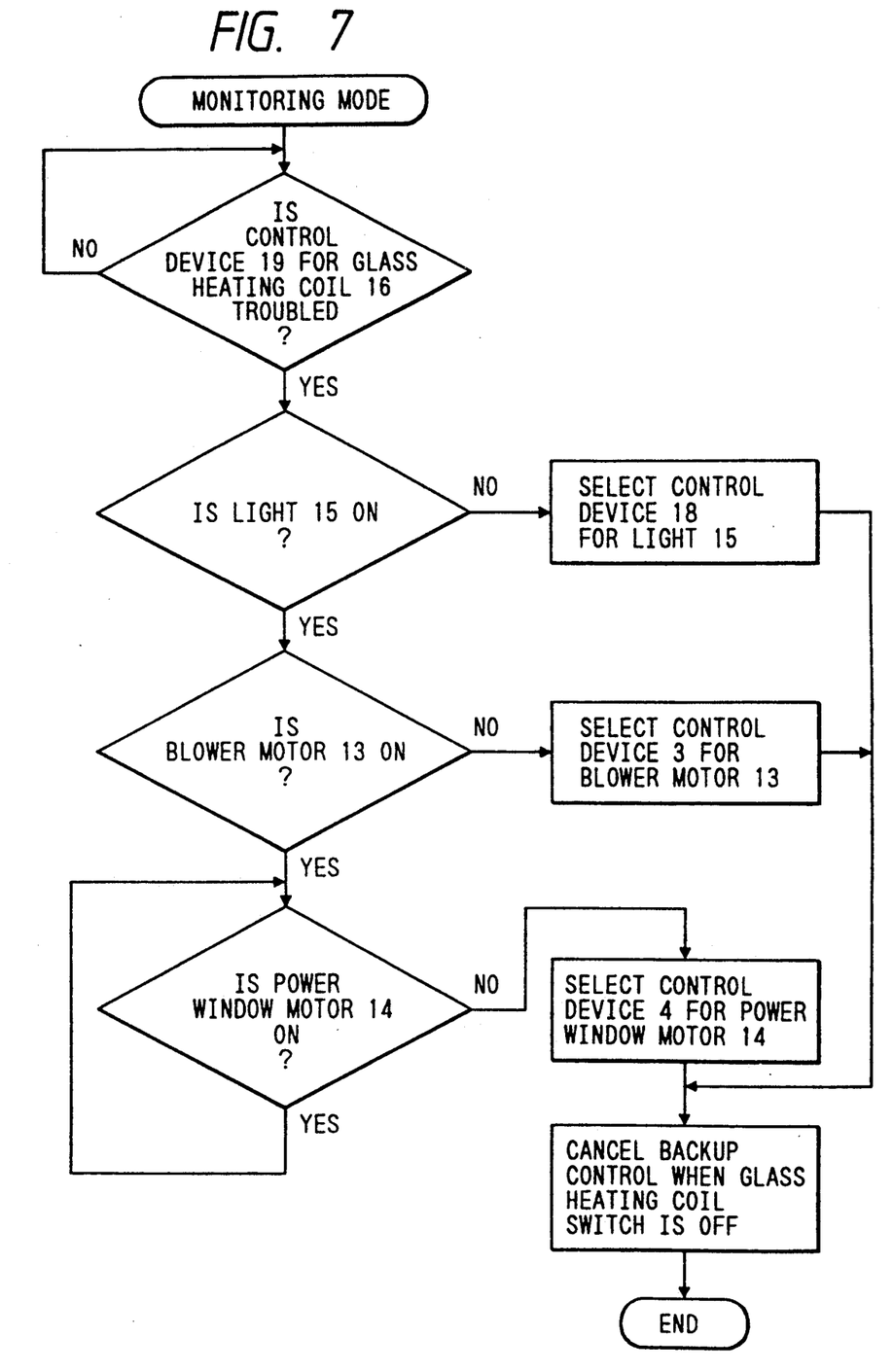

While the glass heating coil 16 remains inoperative as shown in FIG. 7, the control device for the load which stops operating is selected as a substitute in consideration of the condition of use of the light 15, the blower motor 13 or the power window motor 14; if all of them are held on, the control device 4 for the window motor to be used for a short time is selected as a substitute after the use of the window motor is terminated.

The backup is released also in this embodiment when the load controlled by the substitutive control device is turned off and the substitutive control device is switched so that it controls the original load.

This embodiment makes possible the concentration of control functions without the necessity of standby control devices and therefore multiple backup operations. Reliability is thus further enhanced.

Although the aforementioned control systems embodying the present invention have been described as those applicable to automotive electric components, the present invention is not limited to that range of applications but applicable to other systems for controlling the operation of various loads. Moreover, the control device selected as a substitute for the inoperative one may be able to alternately control the driving of the load intended for substitutive control device and that of what has been intended for control device until then.

Although the determination of the substitutive control device, when such a control device is selected, is based on a logical decision flexibly made in view of the condition of use of the load involved and the priority order, a plurality of electric loads may be prearranged in ranks in accordance with the priority order, so that the control device used for the load in a lower rank is decided as a substitutive one.

When the present invention is applied to a control system having a number of loads for control device such as electric automotive parts or the like, the loads and controls corresponding thereto may be divided into groups in such a manner that those close in distance to one another belong to one and the same group at the time they are laid out. The advantage is that power supply wiring connecting the loads and the control devices may be shortened by arranging to select substitutive control devices within the same group.

In addition, the provision of an indicator for informing the backup operation is being performed is also advantageous in that not only inoperative control devices but also their replacement time is readily made known.

As set forth above, in case any one of the control devices develops trouble when the plurality of loads are respectively controlled by the plurality of control device, a control device fit for use as a substitute is selected from among the remaining ones for regular use and used as a backup to ensure a reliable operation control system according to the present invention. As the number of parts for control device can thus be reduced, cost reduction and the rationalized use of the system installation space also become possible.

I claim:

1. A system for controlling plural loads with high reliability, comprising
    plural control devices which are provided corresponding to the respective loads for respectively controlling a corresponding one of the plural loads,
    plural switches for switching over a control device connected to the load from one of the plural loads to another of the plural loads, and
    a monitor circuit for detecting at least one of the control devices which is out of order, for selecting another of the control devices which is out of order, for selecting another of the control devices which is not out of order based on superiority among the loads and for actuating the plural switches so as to disconnect said one of the control devices from the loads corresponding to said one of the control devices and to switch over said one of the control devices from the load having been connected to said one of the control devices to the load corresponding to said other of the control devices.

2. A system for controlling plural loads as defined in claim 1, characterized in that
    said plural control devices respectively have plural control programs for controlling plural loads which are corresponding to the control device being out of order and the other control device.

3. A system for controlling plural loads as defined in claim 1, characterized in that
    said plural control devices respectively supply electric power to the electric loads from an electric source.

4. A system for controlling plural loads as defined in claim 1, characterized by
    said monitor circuit for selecting the other control device based on the superiority which is defined by using frequency of use of the other control device or importance of the load corresponding to the other control device.

5. A system for controlling plural loads with high reliability, comprising
    plural control devices which are provided corresponding to the respective loads for respectively controlling a corresponding one of the plural loads,
    plural switches for switching over a control device connected to the load from one of the plural loads to another of the plural loads, and
    a monitor circuit for detecting at least one of the control devices which is out of order, for selecting another of the control devices which is not out of order based on superiority among the loads and for actuating the plural switches so as to disconnect said other of the control devices from one of the loads corresponding to the other control device and to switch over the load corresponding to said one of the control devices between said one of the control devices and said other of the control devices in a time sharing mode.

6. A system for controlling plural loads as defined in claim 5, characterized in that
    said plural control devices respectively have plural control programs for controlling plural loads which are corresponding to the control device being out of order and the other control device.

7. A system for controlling plural loads as defined in claim 5, characterized in that
said plural control devices respectively supply electric power to the electric loads from an electric source.

8. A system for controlling plural loads as defined in claim 1 or 5, characterized in that
said plural control devices are divided into plural groups including the plural control devices which are near each other and the monitor circuit selects the other control device in the same group.

9. A system for controlling plural loads as defined in claim 1 or 5, characterized in that
said monitor circuit detects the trouble of the control device, and selects or actuates the other control device using a bus line which is commonly connected between the plural control devices and plural loads.

10. A system for controlling plural loads as defined in claim 1 or 5, characterized in that
said monitor selects said other control devices based on the superiority of the load which is not controlled by the corresponding control device.

11. A method for controlling plural loads respectively corresponding to plural control devices with high reliability, comprising the steps of
detecting at least one of the control devices which is out of order,
selecting another of the control devices which is not out of order based on superiority among the electric loads, and
disconnecting said other of the control devices from one of the loads corresponding to the other control device and switching over the load corresponding to said one of the control devices from said one of the control devices to said other of the control devices.

12. A method for controlling plural loads respectively corresponding to plural control devices with high reliability, comprising the steps of
detecting at least one of the control devices which is out of order,
selecting another of the control devices which is not out of order based on superiority among the electric loads, and
disconnecting said other of the control devices from one of the loads corresponding to the other control device and switching over the load corresponding to said one of the control devices between said one of the control devices and said other of the control devices in a time sharing mode.

13. A method for respectively controlling plural loads as defined in claim 11 or 12, characterized in that sad superiority is based on the load which is not controlled y the corresponding control device.

* * * * *